United States Patent [19]

Furukawa et al.

[11] Patent Number: 5,604,288
[45] Date of Patent: Feb. 18, 1997

[54] METHOD FOR THE PREPARATION OF THERMOPLASTIC RESIN COMPOSITIONS

[75] Inventors: Haruhiko Furukawa; Akihiro Nakamura, both of Chiba Prefecture, Japan; Akihiko Shirahata, Midland, Mich.

[73] Assignee: Dow Corning Toray Silicone Co., Ltd., Tokyo, Japan

[21] Appl. No.: 565,652

[22] Filed: Nov. 29, 1995

[51] Int. Cl.$^6$ ........................................ C08K 3/34
[52] U.S. Cl. ................ 524/493; 525/100; 525/104; 525/105; 525/106; 523/212; 523/213
[58] Field of Search ................ 525/100, 104, 525/105, 106; 523/212, 213; 524/493

[56] References Cited

U.S. PATENT DOCUMENTS

| | | | |
|---|---|---|---|
| 2,888,419 | 5/1926 | Safford | 260/29.1 |
| 3,865,897 | 2/1975 | Falender | 260/827 |
| 4,196,731 | 4/1980 | Laurin | 128/214 |
| 4,252,915 | 2/1981 | Bartos | 525/106 |
| 4,273,691 | 6/1981 | MacLaury | 260/23 |

FOREIGN PATENT DOCUMENTS 16824  6/1994  Japan .

*Primary Examiner*—Melvyn I. Marquis
*Attorney, Agent, or Firm*—Alexander Weitz

[57] ABSTRACT

A method for preparing a thermoplastic resin composition, said method comprising hot-kneading, in the absence of a radical-generating catalyst,
(A) 100 parts by weight of a thermoplastic resin; and
(B) 0.1 to 200 parts by weight of an alkenyl-functional polyorganosiloxane filled with amorphous silica micropowder, wherein the weight ratio of said silica micropowder to said alkenyl-functional polyorganosiloxane is 0.01:100 to 50:100, whereby the polyorganosiloxane of component (B) is chemically bonded to resin (A).

20 Claims, No Drawings

METHOD FOR THE PREPARATION OF THERMOPLASTIC RESIN COMPOSITIONS

FIELD OF THE INVENTION

This invention relates to a method for the preparation of thermoplastic resin compositions. More particularly, this invention relates to a highly productive method for the preparation of thermoplastic resin compositions in which a thermo plastic resin and a polyorganosiloxane are homogeneously dispersed and chemically bonded to each other.

BACKGROUND OF THE INVENTION

There have been numerous attempts at improving the moldability, surface lubricity, release properties, and water repellency, of thermoplastic resins by blending therein a polyorganosiloxane, for example, dimethylpolysiloxane. Unfortunately, polyorganosiloxane bleed from the surface occurs both during and after molding operations on the thermoplastic resin compositions afforded by these methods, and this causes such problems as a decline in surface lubricity and a reduced mechanical strength. This polyorganosiloxane bleed also causes other problems, such as contamination of the surrounding equipment.

Chemical reaction between the thermoplastic resin and polyorganosiloxane has been pursued in order to deal with these problems. For example, polypropylene-type resin and polyorganosiloxane have been reacted in the presence of a radical-generating catalyst (graft reaction) in order to induce chemical bonding between the two (refer, for example, to Japanese Patent Publication Number Sho 52-36898 and Japanese Patent Application Laid Open Number Hei 6-16824). In these methods, however, the radical reaction between the polypropylene-type resin and the vinyl-functional polyorganosiloxane develops locally, which causes a poor dispersibility of the polyorganosiloxane in the polypropylene-type resin. This results in such problems as, inter alia, providing compositions having poor mechanical strength.

SUMMARY OF THE INVENTION

The present inventors have now discovered a method of production that makes possible execution of the graft reaction between the thermoplastic resin and polyorganosiloxane under conditions which more readily support and facilitate production.

In specific terms, the present invention takes as its object the introduction of a method for the preparation of thermoplastic resin compositions which after molding are free of polyorganosiloxane bleed at the surface and exhibit excellent properties, such as an excellent surface lubricity, and mechanical properties.

The present invention therefore relates to a method for the preparation of thermoplastic resin compositions, said method comprising hot-kneading, in the absence of a radical-generating catalyst,
(A) 100 weight parts of a thermoplastic resin and
(B) 0.1 to 200 weight parts of an alkenyl-functional polyorganosiloxane filled with amorphous silica micropowder, with the proviso that the silica micropowder: alkenyl-functional polyorganosiloxane weight ratio falls in the range from 0.01 : 100 to 50 : 100,
whereby said polyorganosiloxane in component (B) becomes chemically bonded to said thermoplastic resin (A).

The present invention has been disclosed in Japanese Laid Open Patent Application Number Hei 06-317510, the full disclosure of which is hereby incorporated by reference.

DETAILED DESCRIPTION OF THE INVENTION

To explain the preceding in greater detail, no specific restrictions apply to the type, of the thermoplastic resin (A) used by the present invention as long as it can be plasticized by heat and thereby reacts with the alkenyl-functional polyorganosiloxane in component (B). This thermoplastic resin (A) encompasses the polymers and copolymers derived from vinylic monomers and its preferred embodiments are resins obtained by the polymerization of one or more vinylic monomers and copolymers between such resins and other resins. The thermoplastic resin is exemplified by polyethylene, polypropylene, polymethylpentene, polyvinyl acetate, polyvinyl chloride, polyvinylidene chloride, polyvinyl fluoride, polyvinylidene fluoride, polystyrene, polymethyl methacrylate, polyethyl methacrylate, polybutyl methacrylate, polymethyl acrylate, polyethyl acrylate, and polybutyl acrylate, and by copolymers composed of two or more of the preceding, such as ethylene-propylene copolymers, ethylene-vinyl acetate copolymers, ethylene-vinyl chloride copolymers, ethylene-methyl methacrylate copolymers, styrene-acrylonitrile copolymers, styrene-acrylonitrile-butadiene copolymers, and so forth.

The thermoplastic resin (A) used in the preparative method according to the present invention is preferably substantially free of antioxidant. This means for the present purposes that antioxidant has not been purposely blended into the thermoplastic resin after its polymerization. This condition therefore does not exclude trace amounts of additive still capable of functioning as an antioxidant that may remain from additive already present in or added to the starting monomer for the polymerization process and unconsumed or unremoved after completion of the polymerization process. The content of such antioxidant preferably does not exceed 0.01 weight % and more preferably does not exceed 0.001 weight % of component (A).

Component (B) consists of alkenyl-functional polyorganosiloxane into which amorphous silica micropowder has been blended, and its use makes possible development of the reaction between component (A) and the alkenyl-functional polyorganosiloxane in component (B) under conditions which more readily support and facilitate preparation of the composition when components (A) and (B) are hot-kneaded. The amorphous silica powder used in component (B) is exemplified by fumed silica, wet-process silica, and such silicas which are treated with, for example, organosilane, organosilazane, or organopolysiloxane. Preferred among these are the ultrafine silicas having particle diameters no greater than 50 microns and specific surfaces of at least 50 $m^2/g$.

The polyorganosiloxane bearing Si-bonded alkenyl reacts with, and chemically bonds to, the thermoplastic resin described hereinbefore. This reaction is also typically known as a graft reaction. The polyorganosiloxane must contain at least 1 silicon-bonded alkenyl group in each molecule, and its molecular structure may be straight chain, partially branched, or cyclic. The alkenyl group, which is required for the development of a graft reaction between the thermoplastic resin and Si-bonded alkenyl-functional polyorganosiloxane, is specifically exemplified by vinyl, propenyl, butenyl, pentenyl, hexenyl, decenyl, and so forth. The non-alkenyl silicon-bonded organic groups are nonexhaustively exemplified by the hydroxyl group; substituted and unsubstituted alkyl groups, such as methyl, ethyl, propyl, 3,3,3-trifluoropropyl, 3-chloropropyl, and so forth; substituted and unsubstituted cycloalkyl groups, such as cyclopentyl and cyclohexyl; substituted and unsubstituted aryl groups, such as phenyl, xylyl, and so forth; substituted and unsubstituted aralkyl groups, such as benzyl, phenethyl, 3-phenylpropyl, and so forth; and substituted and unsubstituted alkoxy groups, such as methoxy, ethoxy, and propoxy.

The polyorganosiloxane is itself exemplified by dimethylvinylsiloxy-endblocked polydimethylsiloxanes, dimethylvinylsiloxy-endblocked dimethylsiloxane-methylvinylsiloxane copolymers, trimethylsiloxy-endblocked polymethylvinylsiloxanes, trimethylsiloxy-endblocked dimethylsiloxane-methylvinylsiloxane copolymers, dimethylhexenylsiloxy-endblocked polydimethylsiloxanes, dimethylhexenylsiloxy-endblocked dimethylsiloxane-methylhexenylsiloxane copolymers, trimethylsiloxy-endblocked polymethylhexenylsiloxanes, and trimethylsiloxy-endblocked dimethylsiloxane-methylhexenylsiloxane copolymers.

The alkenyl-functional polyorganosiloxane preferably has a viscosity at 25° C. of at least 1 million centistokes, while viscosities of at least 5 million centistokes are even more preferred.

Moreover, the alkenyl-functional polyorganosiloxane preferably contains no more than 50,000 weight-ppm (parts per million), and more preferably no more than 20,000 weight-ppm, of low-molecular-weight siloxane having a vapor pressure equal to or greater than 10 mmHg at 200° C.

Component (B) used by the present invention consists of the mixture of the above-described amorphous silica micropowder with the above-described alkenyl-functional polyorganosiloxane. The amorphous silica micropowder: alkenyl-functional polyorganosiloxane mixing ratio must fall in the range from 0.01:100 to 50:100 on a weight basis and preferably falls in the range from 0.1:100 to 30:100 on a weight basis. Silica weight proportions below 0.01:100 are undesirable because at such values the graft reaction will not occur under conditions that support and facilitate preparation of the composition. Silica weight proportions above 50:100 are also undesirable because they yield thermoplastic resin compositions with an unsatisfactory surface lubricity, water repellency, and release performance.

The component (B) used in the preparative method according to the present invention is prepared simply by mixing the above-described amorphous silica micropowder with the above-described alkenyl-functional polyorganosiloxane to homogeneity using the usual mixing equipment, for example, a 2-roll mill, Ross mixer, Henschel mixer, or the like.

The above-described components (A) and (B) are hot-kneaded in the absence of a radical-generating catalyst in the preparative method according to the present invention. This hot-kneading functions to interdisperse and mix components (A) and (B) and—through radical generation in component (A) due to the heat and shear energy applied to the system—to initiate and advance the graft reaction with component (B). By adjusting the induction period until graft reaction initiation (hereinafter abbreviated as the induction period) and the rate of reaction development through selection of the kneading temperature and kneading rate, it is possible in the process under consideration to initiate, develop, and complete the graft reaction after having achieved a thorough dispersion of components (A) and (B). Moreover, this hot-kneading must be conducted in the absence of a radical-generating catalyst. Components (A) and (B) will react locally in the presence of a radical-generating catalyst and a homogeneous thermoplastic resin composition will not be obtained.

The kneading time selected for the hot-kneading process must be sufficient for the dispersion and mixing of components (A) and (B) and for the ensuing initiation, development, and completion of the graft reaction. In specific terms, the kneading time necessary for dispersion and mixing of components (A) and (B) is preferably from 1 to 60 minutes. The kneading time necessary for the ensuing initiation, development, and completion of the graft reaction is also preferably from 1 to 60 minutes.

Higher kneading temperatures and higher kneading rates each lead to a shorter induction period and a more rapid rate of reaction development. With these considerations as background, the optimal kneading temperature and kneading rate for the instant process must be selected so as to satisfy the kneading time required for dispersion and mixing of components (A) and (B) and the kneading time necessary for the subsequent initiation, development, and completion of the graft reaction. In specific terms, the preferred range for the kneading temperature is from 150° C. to 260° C. The kneading rate should be determined so as to bring the induction period and rate of reaction development into their preferred ranges.

The equipment used in the preparative method according to the present invention can be the batch kneaders and heated continuous kneaders that are generally used for kneading thermoplastic resins. The kneading efficiency, kneading rate, and so forth depend on the design of the equipment, and the following are preferred for their ability to generate a sufficient level of shear energy: the Banbury mixer among the batch devices, and, among the continuous devices, the continuous twin-screw kneading extruders and continuous kneading extruders equivalent in efficiency to said twin-screw extruders. Among these, the twin-screw kneading extruders are particularly preferred for their high kneading efficiencies and high heating and radiation efficiencies.

The preparative method according to the present invention induces the chemical bonding of component (B) to component (A), wherein the reaction and chemical bonding of at least about 50 weight % of the alkenyl-functional polyorganosiloxane in component (B) is preferred and the reaction and chemical bonding of at least about 70 weight % of the polyorganosiloxane of component (B) is particularly preferred. Reaction conversions below 50 weight % result in such problems as bleed of the polyorganosiloxane of component (B) from the resulting thermoplastic resin composition and a decline in the mechanical properties thereof.

Insofar as the object of the present invention is not impaired, the various modifiers and additives generally used in conjunction with thermoplastic resins may be added in the preparative method according to the present invention, either during or after the hot-kneading process. These are exemplified by molding improvers such as dimethylpolysiloxane, methylphenylsiloxane, polydiphenylsiloxane, polymethyl(3,3,3-trifluoropropyl)siloxane, etc.; antistatics; pigments; and so forth.

Moreover, the preparative method according to the present invention permits the blending of antioxidants into the product mixture after the hot-kneading of components (A) and (B). In fact, when molding operations are to be carried out on the thermoplastic resin composition afforded by the preparative method according to the present invention, this addition of antioxidant is preferred since this can inhibit oxidative decomposition of the composition. The antioxidant should be added at from 0.1 to 5 weight parts and more preferably at from 0.1 to 2 weight parts, in each case per 100 weight parts of the total quantity of components (A) and (B). The nature of the antioxidant is not critical, and the following can be used: phenolics, amines, quinolines, hydroquinolines, mercaptans and sulfides, dithio acids, phosphites, etc. The phenolics are exemplified by 2,6-di-tert-butyl-4-methylphenol, 2,4-dimethyl-6- tert-butylphenol, 3-tert-butyl-4-hydroxyanisole, 2,6-dioctadecyl-p-cresol, styrenated phenols, and so forth; the amines are exemplified by phenyl-alpha-naphthylamine, phenyl-beta-naphthylamine, diphenylamine, N,N'-diphenyl-p-phenylenediamine, and so forth; the mercaptans and sulfides are exemplified by dodecyl mercaptan, tetramethylthiuram disulfide, phenothiazine, and so forth; the dithioacids are exemplified by zinc ethylphenyldithiocarbamate, and so forth; and the phosphites are exemplified by triphenyl phosphite, diphenyldecyl phosphite, phenyldidecyl phosphite, and so forth.

The thermoplastic resin compositions afforded by the preparative method according to the present invention have excellent mechanical properties and an excellent moldability, mold-releasability, surface lubricity, and so forth, and in consequence thereof are useful as molding resins. They are also useful as additives for improving the physical properties of a variety of thermoplastic resins.

EXAMPLES

The present invention will be explained below in greater detail through working examples. In the working and comparative examples, "parts" denotes "weight parts," the viscosity is the value measured at 25° C., and "cSt" is an abbreviation for "centistokes". The following methods were used in the examples to measure the graft reaction conversion, average dispersed particle diameter of the polyorganosiloxane phase, and surface condition of the molding.

Measurement of the Graft Reaction Conversion

A 2 g thermoplastic resin composition sample was cut into approximately 1 mm cubes and placed in a round-bottom flask equipped with a reflux condenser. One hundred grams of hexane was added, followed by heating under reflux for 1 hour. After filtering off the hexane insolubles and transfer to a glass dish, the hexane was eliminated by heating at 60° C. Weighing then gave the hexane extraction proportion. The graft reaction conversion was calculated as indicated below from the hexane extraction proportion and the total polyorganosiloxane content in the sample.

graft reaction conversion=(total polyorganosiloxane content in the sample–hexane extraction proportion)×100/total polyorganosiloxane content in the sample.

Measurement of the Average Particle Diameter of the Polyorganosiloxane Phase in the Thermoplastic Resin Composition A sample of the thermoplastic resin composition was cooled with liquid nitrogen and then crushed. The number average particle diameter of the polyorganosiloxane phase dispersed in the thermoplastic resin composition was determined by analyzing the fracture surface with a scanning electron microscope and an x-ray microanalyzer.

Surface Condition of the Molding

The thermoplastic resin composition was compression molded at 180° C. to give a 2 mm-thick sheet. The surface of this sheet was visually inspected for uniformity and polyorganosiloxane bleed, and the results of this inspection were reported according to the following scale.

++: uniform surface, no polyorganosiloxane bleed
+: uniform surface, but polyorganosiloxane bleed is observed
+: nonuniform surface, polyorganosiloxane bleed is observed

Example 1

Two hundred grams of a dimethylvinylsiloxy-endblocked dimethylsiloxane-methylvinylsiloxane copolymer (viscosity=10,000,000 cSt, dimethylsiloxane unit : methylvinylsiloxane unit molar ratio=99.4:0.6) and 6.0 g of a fumed silica with a specific surface of 200 $m^2$/g were mixed on a two-roll mill at room temperature to give a translucent fluid. This fluid (10.3 g) and 15.0 g of an ethylene-vinyl acetate copolymer (brand name: Evatate K2010, product of Sumitomo Chemical Company, Limited) were placed in a 30-cc LabPlast mill and mixed for 5 minutes at 100 rpm to give a solid, white thermoplastic resin composition. The graft reaction conversion and average particle diameter of the polyorganosiloxane phase were measured on the obtained thermoplastic resin composition, and the surface condition of a molding prepared therefrom was also evaluated. These results are reported in Table 1 below.

Example 2

A solid, white thermoplastic resin composition was prepared as in Example 1, but in this case using a dimethylvinylsiloxy-endblocked dimethylsiloxane-methylhexenylsiloxane copolymer (viscosity=10,000,000 cSt, dimethylsiloxane unit : methylhexenylsiloxane unit molar ratio=99.4:0.6) in place of the dimethylvinylsiloxy-endblocked dimethylsiloxane-methylvinylsiloxane copolymer that was used in Example 1. The properties of the obtained thermoplastic resin composition were measured as in Example 1, and these results are reported in Table 1 below.

Example 3

A solid, white thermoplastic resin composition was prepared as in Example 1, but in this case using a linear low-density polyethylene resin (brand name: Sumikathene-L FA201-0, product of Sumitomo Chemical Company, Limited) in place of the ethylene-vinyl acetate copolymer that was used in Example 1. The properties of the obtained thermoplastic resin composition were measured as in Example 1, and these results are reported in Table 1 below.

Example 4

A solid, white thermoplastic resin composition was prepared as in Example 1, but in this case using an ethylene-methyl methacrylate copolymer (brand name: Acryft WD301, product of Sumitomo Chemical Company, Limited) in place of the ethylene-vinyl acetate copolymer that was used in Example 1. The properties of the obtained thermoplastic resin composition were measured as in Example 1, and these results are reported in Table 1 below.

Comparative Example 1

Fifteen grams of an ethylene-vinyl acetate copolymer (brand name: Evatate K2010, product of Sumitomo Chemical Company, Limited) and 10.0 g of a dimethylvinylsiloxy-endblocked dimethylsiloxane-methylvinylsiloxane copolymer (viscosity=10,000,000 cSt, dimethylsiloxane unit:methylvinylsiloxane unit molar ratio=99.4:0.6) were placed in a 30-cc LabPlast mill and mixed for 5 minutes at 100 rpm to give a solid, white thermoplastic resin composition. The graft reaction conversion and average particle diameter of the polyorganosiloxane phase were measured on the obtained thermoplastic resin composition, and the surface condition of a molding prepared therefrom was also evaluated. These results are reported in Table 1 below.

Comparative Example 2

A solid, white thermoplastic resin composition was prepared as in Comparative Example 1, but in this case replacing the 15.0 g ethylene-vinyl acetate copolymer used in Comparative Example 1 with an ethylene-vinyl acetate copolymer mixture prepared by mixing 0.2 g of 2,5-dimethyl-2,5-di(tert-butylperoxy)hexane as a hexane solution into 15.0 g of the ethylene-vinyl acetate copolymer used in Comparative Example 1, and thereafter drying. The graft reaction conversion and average particle diameter of the polyorganosiloxane phase were measured on the obtained thermoplastic resin composition, and the surface condition of a molding prepared therefrom was also evaluated. These results are reported in Table 1 below.

Comparative Example 3

A solid, white thermoplastic resin composition was prepared as in Comparative Example 1, but in this case using a dimethylvinylsiloxy-endblocked dimethylsiloxane-methylhexenylsiloxane copolymer (viscosity=10,000,000 cSt, dimethylsiloxane unit : methylhexenylsiloxane unit molar ratio=99.4:0.6) in place of the dimethylvinylsiloxy-endblocked dimethylsiloxane-methylvinylsiloxane copolymer that was used in Comparative Example 1. The properties of the obtained thermoplastic resin composition were measured as in Example 1, and these results are reported in Table 1 below.

Comparative Example 4

A solid, white thermoplastic resin composition was prepared as in Comparative Example 1, but in this case using a linear low-density polyethylene resin (brand name: Sumikathene-L FA201-0, product of Sumitomo Chemical Company, Limited) in place of the ethylene-vinyl acetate copolymer that was used in Comparative Example 1. The properties of the obtained thermoplastic resin composition were measured as in Example 1, and these results are reported in Table 1 below.

Comparative Example 5

A solid, white thermoplastic resin composition was prepared as in Comparative Example 1, but in this case using an ethylene-methyl methacrylate copolymer (brand name: Acryft WD301, product of Sumitomo Chemical Company, Limited) in place of the ethylene-vinyl acetate copolymer that was used in Comparative Example 1. The properties of the obtained thermoplastic resin composition were measured as in Example 1, and these results are reported in Table 1 below.

TABLE 1

| | graft reaction conversion (%) | average dispersed particle diameter of the polyorganosiloxane phase (micrometers) | surface condition of the molding | overall evaluation |
|---|---|---|---|---|
| Example 1 | 91 | 15 | ++ | ++ |
| Example 2 | 90 | 10 | ++ | ++ |
| Example 3 | 85 | 15 | ++ | ++ |
| Example 4 | 93 | 15 | ++ | ++ |
| Comp. Example 1 | 29 | 15 | + | x |
| Comp. Example 2 | 95 | 100 | x | x |
| Comp. Example 3 | 31 | 10 | + | x |
| Comp. Example 4 | 21 | 15 | + | x |
| Comp. Example 5 | 28 | 15 | + | x |

That which is claimed is:

1. A method for preparing a thermoplastic resin composition, said method comprising hot-kneading, in the absence of a radical-generating catalyst,
   (A) 100 parts by weight of a thermoplastic resin derived from at least one vinylic monomer ; and
   (B) 0.1 to 200 parts by weight of an alkenyl-functional polyorganosiloxane filled with amorphous silica micropowder,
   wherein the weight ratio of said silica micropowder to said alkenyl-functional polyorganosiloxane is 0.01:100 to 50:100, whereby said polyorganosiloxane of component (B) becomes chemically bonded to said thermoplastic resin (A).

2. The method according to claim 1, wherein at least 50 weight percent of said alkenyl-functional polyorganosiloxane in component (B) is chemically bonded to said thermoplastic resin (A).

3. The method according to claim 1, wherein said alkenyl-functional polyorganosiloxane in component (B) contains ≦50,000 parts per million by weight of a low molecular weight siloxane having a vapor pressure≧10 mmHg at 200° C.

4. The method according to claim 1, wherein said alkenyl-functional polyorganosiloxane in component (B) has a viscosity of at least 1,000,000 centistokes at 25° C.

5. The method according to claim 1, wherein said thermoplastic resin (A) is a homopolymer or copolymer derived from a vinylic monomer.

6. The method according to claim 1, wherein said thermoplastic resin (A) is selected from the group consisting of polyethylene, polypropylene, polymethylpentene, polyvinyl acetate, polyvinyl chloride, polyvinylidene chloride, polyvinyl fluoride, polyvinylidene fluoride, polystyrene, polymethyl methacrylate, polyethyl methacrylate, polybutyl methacrylate, polymethyl acrylate, polyethyl acrylate, polybutyl acrylate, ethylene-propylene copolymer, ethylene-vinyl acetate copolymer, ethylene-vinyl chloride copolymer, ethylene-methyl methacrylate copolymer, styrene-acrylonitrile copolymer and styrene-acrylonitrile-butadiene copolymer.

7. The method according to claim 2, wherein the viscosity of said alkenyl-functional polyorganosiloxane in component (B) is at least 1 million centistokes at 25° C.

8. The method according to claim 7, wherein the alkenyl radicals of said alkenyl-functional polyorganosiloxane in component (B) are selected from the group consisting of vinyl, propenyl, butenyl, pentenyl, hexenyl and decenyl.

9. The method according to claim 8, wherein said alkenyl-functional polyorganosiloxane in component (B) is selected from the group consisting of dimethylvinylsiloxy-endblocked polydimethylsiloxanes, dimethylvinylsiloxy-endblocked dimethylsiloxane-methylvinylsiloxane copolymers, trimethylsiloxy-endblocked polymethylvinylsiloxanes, trimethylsiloxy-endblocked dimethylsiloxane-methylvinylsiloxane copolymers, dimethylhexenylsiloxy-endblocked polydimethylsiloxanes, dimethylhexenylsiloxy-endblocked dimethylsiloxane-methylhexenylsiloxane copolymers, trimethylsiloxy-endblocked polymethylhexenylsiloxanes and trimethylsiloxy-endblocked dimethylsiloxane-methylhexenylsiloxane copolymers.

10. The method according to claim 1, wherein the diameter of said silica particles is $\leq 50$ microns and the specific surface area of said silica is at least 50 m$^2$/g.

11. The method according to claim 10, wherein 0.1 to 30 parts by weight of said silica are used for each 100 parts by weight of said alkenyl-functional polyorganosiloxane in component (B).

12. The method according to claim 2, wherein the diameter of said silica particles is $\leq 50$ microns and the specific surface area of said silica is at least 50 m$^2$/g.

13. The method according to claim 12, wherein 0.1 to 30 parts by weight of said silica are used for each 100 parts by weight of said alkenyl-functional polyorganosiloxane in component (B).

14. The method according to claim 5, wherein the diameter of said silica particles is $\leq 50$ microns and the specific surface area of said silica is at least 50 m$^2$/g.

15. The method according to claim 14, wherein 0.1 to parts by weight of said silica are used for each 100 parts by weight of said alkenyl-functional polyorganosiloxane in component (B).

16. The method according to claim 1, wherein the hot-kneading is carried out at a temperature of 160° C. to 260° C.

17. The method according to claim 2, wherein the hot-kneading is carried out at a temperature of 160° C. to 260° C.

18. The method according to claim 4, wherein the hot-kneading is carried out at a temperature of 160° C. to 260° C.

19. The method according to claim 5, wherein the hot-kneading is carried out at a temperature of 160° C. to 260° C.

20. The method according to claim 8, wherein the hot-kneading is carried out at a temperature of 160° C. to 260° C.

* * * * *